United States Patent [19]
Brown

[11] 3,782,756
[45] Jan. 1, 1974

[54] VEHICULAR SAFETY SYSTEM

[76] Inventor: Alexander M. Brown, 715 S. Bend St., Apt. 309D, Daytona Beach, Fla.

[22] Filed: Sept. 2, 1971

[21] Appl. No.: 177,331

[52] U.S. Cl. ............................................ 280/150 B
[51] Int. Cl. ............................................ B60r 21/02
[58] Field of Search................... 280/150 B, 150 SB

[56] References Cited
UNITED STATES PATENTS

| | | | |
|---|---|---|---|
| 3,133,746 | 5/1964 | Zazzara | 280/150 B |
| 2,025,822 | 12/1935 | Pryor | 280/150 B |
| 2,854,281 | 9/1958 | Cassin | 280/150 B |
| 3,325,208 | 6/1967 | Rose | 280/150 B |

Primary Examiner—Robert R. Song
Attorney—Roger L. Martin

[57] ABSTRACT

A power source actuating the protective mechanism shielding the occupants of a vehicle involved in collision which is activated, without the need for sensors or switching devices, by the inertial forces released due to the sudden deceleration of the vehicle. The protective mechanism includes a flexible cage restraining means positioned by a pivoted lever driven by the power source. Means are included for increasing the speed of the power source so that the protective mechanism is always driven at a proportionately higher speed than that of the occupant in relation to the speed of the decelerating vehicle.

7 Claims, 6 Drawing Figures

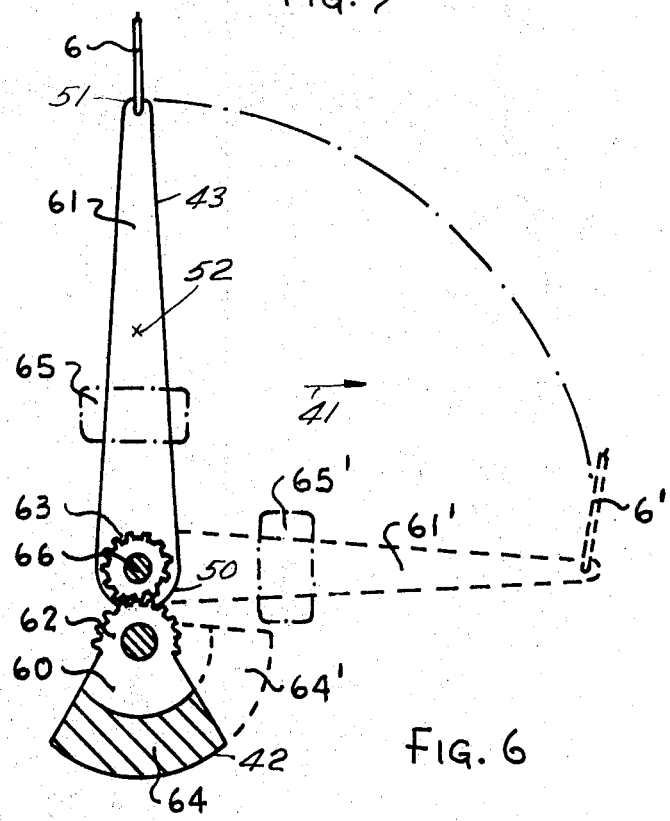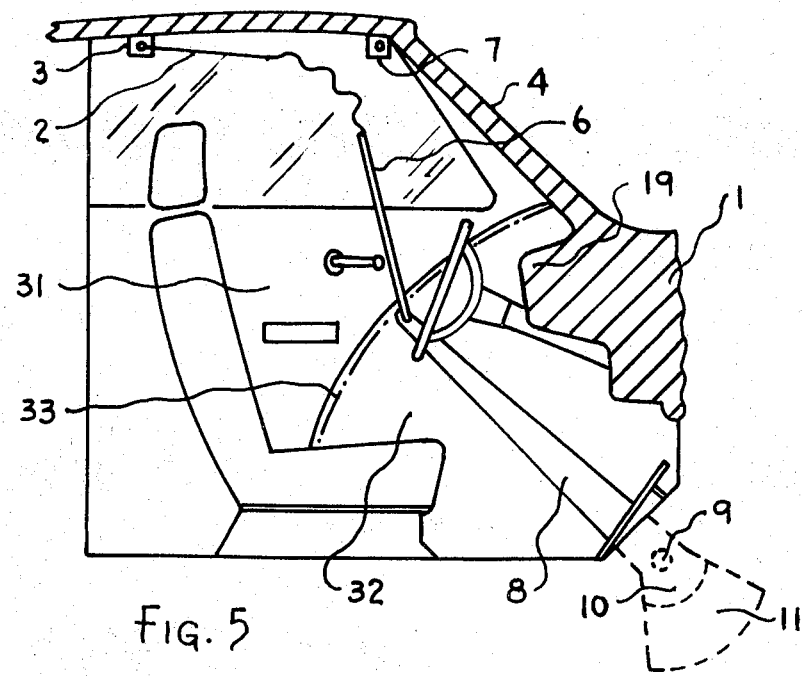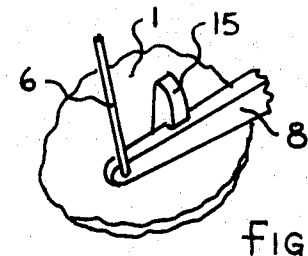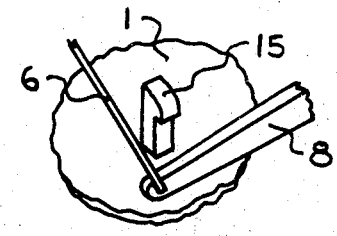

3,782,756

VEHICULAR SAFETY SYSTEM

BACKGROUND OF THE PRESENT INVENTION

Prior vehicular passenger protective systems have been of the voluntary and involuntary types. The voluntary, consisting of belts and harnesses into which the occupant of the vehicle strapped himself for restraint in the event of collision, are well known and perform satisfactorily except that many occupants of vehicles do not use them. The involuntary systems, or those which protect without conscious effort on the part of the vehicle occupant, have consisted of padding, rigid cages, head rests, etc., such devices being built into the vehicle. There have also been attempts to install movable nets or slats and, more recently, attempts have been made to install bag-like balloons which inflate upon impact to force the occupants back into the seat cushions and prevent injury due to striking of the body against the interior of the vehicle. Problems encountered with this device have prevented itsuse in the automotive field.

Among the problems encountered are; difficulty in inflating the bag with sufficient speed to prevent movement of the body of the vehicle occupant, difficulty in sensing the moment of impact with sufficient accuracy to activate the inflating mechanism exactly when needed, accidental inflation of the bag which could prevent normal operation of the vehicle and could cause accident to the vehicle or a passenger, and the problem of multiple collision when the bag has once collapsed after inflation and is of no value as a restraining mechanism in case of further impact.

It is an object of the present invention to obviate the problems in the prior art restraint devices as noted above.

SUMMARY OF THE PRESENT INVENTION

In accordance with one form of the present invention, there is utilized a flexible barrier shield approximately as wide as the interior of the vehicle and of sheet material which is of sufficient strength, transparent and slightly resilient. This shield is fitted, preferably, to the overhead interior of the vehicle with one end anchored and the other end extending forward toward the front of the vehicle. This forward edge of the flexible shield is then affixed to reinforcing thongs which are loosely attached to overhead positions at each side of the vehicle and extend downwardly to be affixed to two levers which are pivoted one at each side of the vehicle.

Movement of the levers downwardly along the sides of the vehicle will draw the thongs and the attached shield down until the shield is in a position between the occupants and the front of the vehicle.

To provide a power source which will actuate the shield mechanism instantaneously in the event of a collision, arms, which are integral with the levers, extend downwardly from the pivots and carry pendulum type weights which retain the levers in the upright position and have sufficient mass to provide the kinetic energy required to actuate the levers under the same inertial forces which cause injury to the occupant of the vehicle.

Movement of the levers, which occurs upon impact or sudden stopping of the vehicle, is powered by the kinetic energy stored in the pendulum weights while the vehicle is in motion. In the event of sudden deceleration, the pivots, being integral with the body of the vehicle, stop, but the weights, which hang free, continue to move forward thereby pivoting the levers downwardly to draw down the shield and enclose the occupants within a flexible cage comprised of the seat cushions in the rear and the shield in the front.

Since the loosely hanging weight and the body of the occupant are moving at the same velocity, they continue at the same speed after impact. It is therefore necessary to increase the speed of the power source, the weight, in order to move the shield from the vehicle ceiling to seat level before the body of the occupant strikes the shield.

This can be done by increasing the length of the lever to the shield over the length of the arm to the weight so that the speed of the lever is multiplied and the full movement of the shield can be accomplished while the weight, and the body of the occupant, have traveled only a short distance.

For as long as the vehicle continues to decelerate, the kinetic energy of the weights will retain the levers in the fully activated position thereby locking the shield in position to absorb the momentum of the occupantswithout injury to them. When the vehicle has been stopped and all parts have lost their momentum, gravity returns the weights to their original position lifting the levers and loosening the shield to free the occupants.

Alternately, the levers can be locked into the activated position by a ratchet, spring latch, or other means, to prevent loosening of the shield due to the momentum of the forces acting on it. In this case, when the vehicle comes to a halt, the levers are released manually or automatically to loosen the shield and permit removal of the occupants.

In alternate constructuons, gearing, and repositioning of the weights, give the necessary increase in operating speed and/or reverse the movement of the levers.

BRIEF DESCRIPTION OF THE DRAWINGS

FIG. 3 is a fragmentary view of one form of latch used to lock the levers in activated position.

FIG. 4 is a fragmentary view of FIG. 3 showing the lever disengaged from the latch.

FIG. 5 is a fragmentary section of the interior of a vehicle with one side removed to show means of isolating the vehicle occupant from the movement of the levers.

FIG. 6 is a fragmentary view of a power source illustrating alternate means for increasing the speed and/or reversing the direction of movement of the levers.

DETAILED DESCRIPTION OF THE PREFERRED EMBODIMENT

Figure 1:
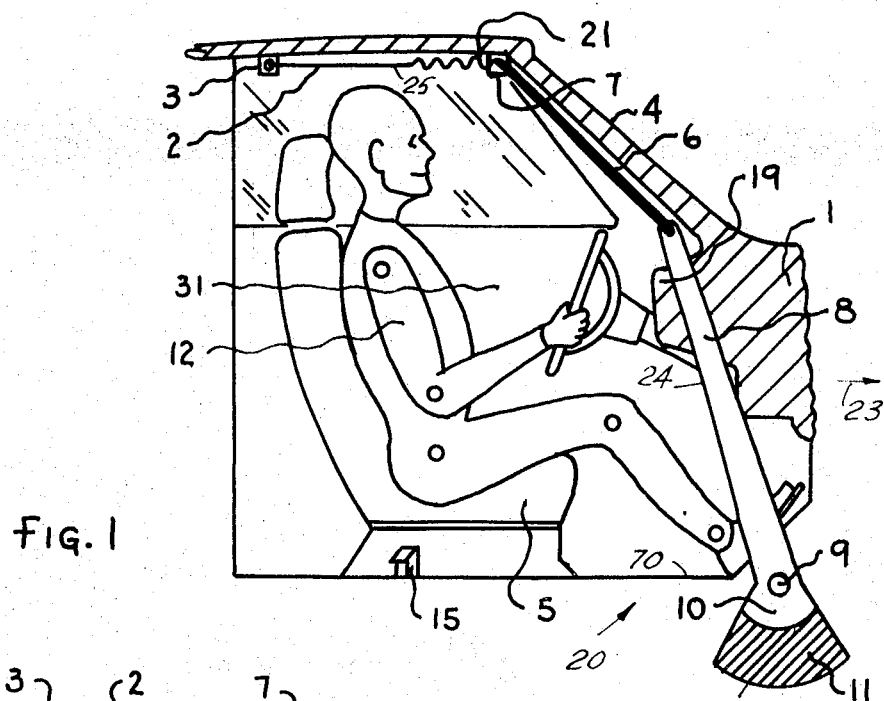
FIG. 1 is a fragmentary section of the interior of a vehicle with one side removed to show the power source and the restraint mechanism in normal position.

Referring now to FIG. 1 of the drawings, the vehicle body 1 has a shield 2 affixed to the interior of the roof 3 above the back of the seat 5 and extending forwardly to windshield posts 4. The shield 2 forms a barrier component of an occupant restraining mechanism 20 and is of a width approximately the same as the interior of the vehicle and can be formed of a flexible fabric, film or net material, singly or in combination, which is preferably transparent so as not to obstruct vision, slightly resilient to dampen momentum without damage to the occupant 12, shown as a test dummy, and of a length to reach just above the seat 5 of the vehicle.

Since the shield 2 is longer than the ceiling space above the seat 5, it can be folded, pleated, elastic, fitted into a container or otherwise reduced in length to fit the available ceiling space. This reduction in length should be in the forward half 21 of the shield 2 to avoid wiping over the head of the occupant 12 as the shield 2 is drawn downwardly.

Thongs 6 are attached across the front edge of the shield 2 and are clipped to the windshield posts 4 by spring clips 7 or other releasable means. The thongs 6 then extend downwardly and are affixed to the ends of two levers 8 one on each side of dashboard 19.

Levers 8 of mechanism 20 are pivoted one on each side of the body 1 of the vehicle by hinge pins 9 and extend downwardly as arms 10 to weights 11 which are rigidly affixed to arms 10. Weights 11 of mechanism 20 hang freely from hinge pins 9 and gravity serves to retain levers 8, which are of lighter construction, in their positions adjacent dashboard 19. If desired, the weight 11 can be preloaded, or a spring clip or other means can be used, to maintain levers 8 in contact with with the dashboard 19 and to prevent premature movement of levers 8 under conditions of slight deceleration. Pins 9 serve as pivot means that establish a horizontal pivot axis for pivotal movement of the levers 8 and it is deemed obvious that this axis extends transversely to the direction, indicated by arrow 23, of normal movement of the vehicle.

Weights 11 can be located in any appropriate position either under the floor 70, in the engine compartment or hidden within a wall of the vehicle body. It is also understood that while weight 11 is shown as a separate part, some movable part of the vehicle such as a seat, spare tire or battery could be arranged to move under the proper conditions and provide the kinetic energy required to power the safety system.

All components, shield 2, thongs 6, levers 8, hingepins 9 and weights 11 are mounted inconspicuously, in some cases within the framework of the body 1 and in positions where they will not impede entrance to, exit from, or use of the vehicle.

Figure 2:
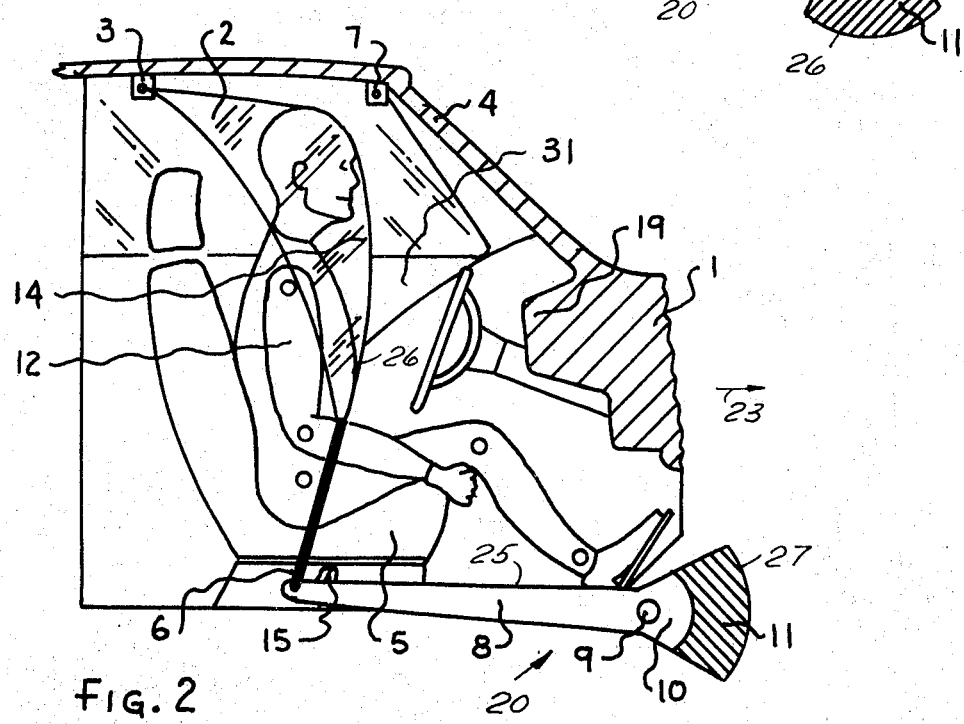
FIG. 2 illustrates FIG. 1 with the power source and the restraint mechanism in use.

On impact, or in the event of sudden stopping of the vehicle, see FIG. 2, the pivot pins 9 decelerate, since they are integral with the body 1, but the momentum of the freely hanging weights 11 causes them to continue their forward motion rotating levers 8 between the doors 31 and the seat 5 to carry thongs 6 and shield 2 down toward seat 5 thereby enveloping occupants 12 in a flexible cage 14 which shields them from the dashboard 19 and absorbs the momentum of their bodies without injury to them.

The kinetic energy of the weights 11 will retain the levers 8 in the fully activated position until the vehicle is halted, at which time gravity returns the weights 11 to their normal position lifting the levers 8 and loosening the shield 2 to permit removal of the occupants 12.

When lever 8 is fully activated, it may be necessary under conditions of extreme deceleration to lock it in place to withstand the forces acting on shield 2. This can be done as by latch 15, see FIG. 3, which contacts the free end of lever 8 at the end of the stroke and resists the stress imparted from shield 2 through thongs 6. Lever 8 can be manually released from latch 15 when the vehicle has stopped to loosen shield 2 and free the occupants 12, or, levers 8 can be so spaced, see FIG. 4, that when tension is relieved from thongs 6 the levers separate from latches 15 automatically.

Levers 8 swing close to the doors 31, see FIG. 5, to protect the occupants 12 while the levers 8 are in motion. The doors 31 can also have a recess 32 or carry guards 33 to further protect the occupants 12 from any possible contact with the moving levers 8.

Obviously, one weight 11 can be so placed as to drive two or more levers 8 or it can be pivoted to swing horizontally if so desired. Also, levers 8 can extend upwardly along posts 4 or roof 3 to contact shield 2 and so eliminate the use of thongs 6 if this should be to advantage.

Since weight 11 and the body of the occupant 12 are moving at like velocity, it is necessary, in the event of a collision, for the action of the levers 8 to be at a higher velocity in order to lower shield 2 before the occupant 12 strikes dashboard 19. One means of accomplishing this is to make lever 8 considerably longer than arm 10, see FIG. 1, so that the circumferential travel at the end of lever 8 is cosiderably greater than that at the end of arm 10 which is the distance from pivot 9 to the center of gravity of weight 11.

For example, if lever 8 is five times the length of arm 10, then 6 inches circumferential travel of arm 10 will result in 30 inches circumferential travel at the end of lever 8. This is more than sufficient to complete the movement of shield 2 urged by thongs 6 attached to levers 8 and to cage the occupants 12 who have also traveled only 6 inches. To express this in another way, the shield 2 will always be drawn down at a speed approximately five times the difference in speed between the body of the occupant 12 and the decelerating vehicle body 1.

The operation of mechanism 20 is apparent. When the vehicle is advancing in the forward direction indicated by arrow 23, the weights 11 retain the levers 8 in their normal positions 24, seen in FIG. 1, and whereat the barrier provided by the shield 2 for restraining forward movement of the occupant 12 is seen in its inactive or stored position 25. Upon head-on impact with another vehicle, the weights pivotally move forwardly from their normal positions 26 (FIG. 1) to their operating positions 27 (FIG. 2) under the influence of inertia. Arms 10 serve as means in this embodiment for transmitting the inertial forward movements of the weights 11 into pivotal movements of the levers 8 and, consequently, the levers 8 are pivotally moved from their normal position 24 to their operating positions designated at 25 in FIG. 2, upon impact with the other vehicle. This pivotal movement of the levers in turn draws the shield downwardly to the occupant restraining position 26 seen in FIG. 2 and thus restrains forward movement of the occupant.

In an alternate construction, see FIG. 6, arm 60 is so geared to lever 61 as to reverse the direction and/or increase the speed of rotation of lever 61. This is accomplished, as shown, with spur gear 62, integral with arm 60, engaging spur gear 63, which may be of a smaller diameter and is integral with lever 61. The gears in this instance provide a means for transmitting the inertial forward movement of the weight into pivotal movement of the arm. Thus on impact, as the vehicle is moving in the direction of arrow 41, weight 64 pivotally moves from its normal position 42 to position 64'. This rotates the gears and carrying the lever 61 from its normal position 43 to position 61' and draws the barrier into an occupant restraining position. By adding an intermediate gear, not shown, the direction of rotation of lever 61 can be again reversed.

In applications where it is advantageous to operate the levers 8 in a forwardly direction, the lever 8 can serve as its own weight. This, too, is illustrated in FIG. 6 where weight 65 relocates the center of gravity of lever 61 to a point between the pivot 66 and the midpoint 52 between the proximal or pivot end 50 and the distal or free end 51 of the lever, and thus close to pivot 66 so that the travel due to the momentum of the heavier portion will rotate the free end 51 of lever 61 rapidly in accordance with the teaching of this invention. Gears 62 and 63 and the weight 64 may, or may not, be used in this alternate construction.

While this invention has been described as applied to a front seat of a vehicle, obviously, it can also be applied to a rear seat or any number of seats as in an aircraft, train, omnibus, or any other vehicle. In some cases, the direction of rotation of the levers can be reversed to advantage, or they can be arranged to rise rather than descend, without departing from the invention here described.

It is also obvious that the weight of the power source could be tethered, arranged to slide, or be otherwise movable to release its kinetic energy and actuate the mechanism.

The shield, which has been described as full sheet material can, if desired, be reduced or eliminated, so that the thong across the front movable edge becomes a seat belt of equivalent barrier which would serve to restrain the occupant in case of collision.

Also, while the present invention has been herein described to operate upon stopping of the vehicle, it obviously can also be arranged to operate in case of collision from the rear. In this event, sudden acceleration will activate the power source which actuates the protective mechanism comprising head shields rising from the back of the front or rear seat.

It is also obvious that the invention described herein has answered all the aforenamed problems encountered in the art, namely:

the occupant is protected at all times by an inconspicuous mechanism and without conscious effort on his part;

the mechanism is entirely mechanical and is activated immediately upon impact without the need for sensors, inertial switches, or other triggering devices;

whatever the speed of the occupant in relation to that of the vehicle, the mechanism acts at a proportionately greater speed to protect him from movement and injury when striking the vehicle;

the present invention cannot be accidentally activated since it is powered only by the same inertial forces released by the extreme acceleration or deceleration of the vehicle which cause the injury to the occupant;

movement of the mechanism will be rapid but comparatively quiet to protect without injuring or frightening the occupants;

the restraining means remains in force until the vehicle is halted or the latches are intentionally disengaged;

since the shield is transparent and can be reduced so as to allow the operator to reach the steering wheel, he can retain some degree of control over the vehicle despite the accident.

I claim:

1. An occupant restraining mechanism for an automotive vehicle having a floor comprising a barrier for restraining forward movement of an occupant of the vehicle and which is mounted on the vehicle for movement between an inactive position and an occupant restraining position, a weight mounted and arranged on the vehicle for inertial movement in a forward direction upon head-on impact of the automotive vehicle with another vehicle, a lever mounted for pivotal movement on said automotive vehicle from an upright position to an inclined position and being connected to the barrier for the movement thereof from its inactive position to its restraining position by said pivotal movement, pivot means establishing a horizontal pivot axis adjacent said floor for said pivotal movement of the lever and which extends transversely of the direction of movement of said automotive vehicle, and transmission means interconnecting the weight and lever for transmitting said inertial forward movement of said weight into said pivotal movement of said lever.

2. An occupant restraining mechanism as defined in claim 1 wherein said weight is pivotally mounted on said vehicle for inertial pivotal movement in said forward direction upon said head-on impact.

3. An occupant restraining mechanism as defined in claim 2 wherein said transmission means comprises an arm which is fixed to and pivotally movable with said lever and said weight.

4. An occupant restraining mechanism as defined in claim 2 wherein said transmission means comprises gear means for transmitting said inertial pivotal movement of said weight into said pivotal movement of said lever.

5. An occupant restraining mechanism as defined in claim 1 which comprises a latch mounted on said automotive vehicle to releasably engage said lever at said second position.

6. An occupant restraining mechanism as defined in claim 2 wherein the lever has a pivot end and a free end and the center of gravity of said lever is located between the midpoint between said pivot end and said free end and said pivot means.

7. An occupant restraining mechanism for an automotive vehicle having a floor comprising a barrier for restraining forward movement of an occupant of the vehicle and which is mounted on the vehicle for movement between an inactive position and an occupant restraining position, a lever mounted for pivotal movement on said automotive vehicle from an upright position to an inclined position pivotally forwardly of said upright position and being connected to the barrier for the movement thereof from its inactive position to its restraining position by said pivotal movement, pivot means establishing a horizontal pivot axis adjacent said floor for said pivotal movement of the lever and which extends transversely of the direction of movement of said automotive vehicle, and said lever having a pivot end and a free end and an inertia weight operatively connected at said pivot end between the midpoint between said pivot end and said free end and said pivot means, whereby said lever is inertially movable from said upright position to said inclined position upon head-on impact of the automotive vehicle with another vehicle.

* * * * *